US 10,939,468 B2

(12) United States Patent
Bakken et al.

(10) Patent No.: US 10,939,468 B2
(45) Date of Patent: Mar. 2, 2021

(54) CLEAR CHANNEL ASSESSMENT

(71) Applicant: Nordic Semiconductor ASA, Trondheim (NO)

(72) Inventors: Vemund Bakken, Trondheim (NO); Meng Cai, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 16/465,993

(22) PCT Filed: Dec. 4, 2017

(86) PCT No.: PCT/GB2017/053643
§ 371 (c)(1),
(2) Date: May 31, 2019

(87) PCT Pub. No.: WO2018/104710
PCT Pub. Date: Jun. 14, 2018

(65) Prior Publication Data
US 2020/0084800 A1 Mar. 12, 2020

(30) Foreign Application Priority Data
Dec. 5, 2016 (GB) ...................................... 1620685

(51) Int. Cl.
*H04W 74/08* (2009.01)
*H04B 1/707* (2011.01)
(Continued)

(52) U.S. Cl.
CPC ........ *H04W 74/0808* (2013.01); *H04B 1/707* (2013.01); *H04B 7/2612* (2013.01); *H04W 16/14* (2013.01); *H04W 84/12* (2013.01)

(58) Field of Classification Search
CPC . H04W 74/0808; H04W 16/14; H04W 84/12; H04B 1/707; H04B 7/2612
See application file for complete search history.

(56) References Cited

U.S. PATENT DOCUMENTS

| 7,876,770 B1 | 1/2011 | Tang et al. |
| 8,009,724 B2 | 8/2011 | Razzell et al. |

(Continued)

FOREIGN PATENT DOCUMENTS

| CN | 1878099 B | 2/2012 |
| CN | 101048948 B | 5/2012 |

OTHER PUBLICATIONS

International Search Report and Written Opinion for PCT/GB2017/053643, dated Feb. 15, 2018, 13 pages.

(Continued)

*Primary Examiner* — Brenda H Pham
(74) *Attorney, Agent, or Firm* — Klarquist Sparkman, LLP

(57) ABSTRACT

A radio receiver is arranged to receive radio signals. The radio receiver includes a tuner, which outputs an electronic signal representing radio waves received by the radio receiver; a correlator, which cross-correlates a predetermined signal pattern with the electronic signal, and outputs a correlation signal; and a clear channel assessment module. The clear channel assessment module determines when the number of peaks in the correlation signal, over a fixed time window, exceeds a threshold count value, and outputs a busy signal in response to determining that the number of peaks exceeds the threshold count value.

13 Claims, 3 Drawing Sheets

(51) Int. Cl.
    *H04B 7/26*      (2006.01)
    *H04W 16/14*     (2009.01)
    *H04W 84/12*     (2009.01)

(56) References Cited

U.S. PATENT DOCUMENTS

| | | |
|---|---|---|
| 2005/0036573 A1 | 2/2005 | Zhang et al. |
| 2006/0217125 A1* | 9/2006 | Miyazaki .......... H04W 74/0808 |
| | | 455/453 |
| 2006/0274863 A1* | 12/2006 | Haentzschel ......... H04J 3/0022 |
| | | 375/343 |
| 2008/0192810 A1* | 8/2008 | Razzell ............... H04L 27/0006 |
| | | 375/150 |

OTHER PUBLICATIONS

Search Report under Section 17(5) for GB16208685.6, dated May 2, 2017, 3 pages.
Zhen et al., "Clear Channel Assessment in Integrated Medical Environments," EURASIP Journal on Wireless Communications and Networking, vol. 2008, Article ID 821756, 8 pages, 2007.
Office action issued in CN201780084957.0 (with best available translation), dated Jan. 4, 2021, 14 pages.

* cited by examiner

CLEAR CHANNEL ASSESSMENT

CROSS REFERENCE TO RELATED APPLICATIONS

This is the U.S. National Stage of International Application No. PCT/GB2017/053643, filed Dec. 4, 2017, which was published in English under PCT Article 21(2), which in turn claims the benefit of Great Britain Application No. 1620685.6, filed Dec. 5, 2016.

This invention relates to methods and apparatus for performing a clear channel assessment (CCA) in a radio receiver.

It is known for a radio receiver or transceiver to check whether a particular radio channel is clear. It may do this in order to detect the start of an incoming radio transmission, intended for the receiver. It may do it in order to determine whether the channel is clear, before it starts transmitting on the channel itself. In the first case, the radio may need to perform this check continually, or even continuously, so that it doesn't miss the start of an incoming data signal. In the second case, the radio may only need to perform the check shortly before it intends to transmit—e.g., in a so-called "listen before talk" protocol.

Such tests, or "clear channel assessments" (CCAs), are typically performed by detecting radio energy above a certain threshold in a particular frequency band. However, where the channel is additionally defined by use of a particular coding or modulation scheme, the radio receiver may also check for a radio waves having certain properties. For example, in a carrier-sense multiple access (CSMA) protocol, a radio receiver will test for the presence of a carrier signal before attempting to transmit.

U.S. Pat. No. 7,876,770 by Marvell International Ltd. describes various IEEE 802.11b receiver designs for using energy thresholding and/or carrier sense in order to perform a clear channel assessment.

However, the carrier-sense designs in U.S. Pat. No. 7,876,770 are complex in implementation and will consume significant power. They are therefore not well suited to very low-power applications, such as a small, battery-powered wireless sensor based on the IEEE 802.15.4 standard (e.g., a Zigbee™ temperature sensor).

The present invention seeks to provide a low-power approach to performing a clear channel assessment in a radio.

From a first aspect, the invention provides a radio receiver arranged to received radio signals, the receiver comprising:
  a tuner arranged to output an electronic signal representing radio waves received by the radio receiver;
  a correlator arranged to cross-correlate a predetermined signal pattern with the electronic signal, and to output a correlation signal; and
  a clear channel assessment module arranged to determine when the number of peaks in the correlation signal, over a fixed time window, exceeds a threshold count value, and to output a busy signal in response to determining that the number of peaks exceeds the threshold count value.

From a second aspect, the invention provides a method of performing a clear channel assessment, the method comprising:
  receiving an electronic signal representing received radio waves;
  cross-correlating a predetermined signal pattern with the electronic signal to generate a correlation signal comprising a sequence of correlation values;
  determining when a number of peaks in the correlation signal, over a fixed time window, exceeds a threshold count value; and
  outputting a busy signal in response to determining that the number of peaks exceeds the threshold count value.

Thus it will be seen by those skilled in the art that, in accordance with the invention, a clear channel assessment can be made by counting correlation peaks and comparing the number of peaks with a threshold value. This can be implemented in digital logic using relatively few gates, and can consume very little power when in operation.

The radio receiver may be a digital receiver. The electronic signal may be a sampled signal—e.g., comprising a sequence of samples at baseband. The samples may be quadrature samples. The electronic signal may be at an intermediate frequency, below a frequency band tuned by the tuner, but is preferably at baseband. The correlation signal may be a discrete signal. The cross-correlation may step in intervals that are equal to a sampling period of the electronic signal, or that are a multiple of the sampling period.

The receiver is preferably arranged to demodulate signals modulated according to a modulation scheme—e.g., a frequency-shifting or phase-shifting modulation scheme, such as binary frequency-shift-keying (BFSK) or offset quadrature-phase-shift-keying (OQPSK). The predetermined signal pattern preferably represents one symbol in the modulation scheme. For example, the predetermined signal pattern may be a waveform representing a zero bit (or a one bit) in a binary modulation scheme, or may be a waveform representing a zero symbol (or some other symbol) in a quadrature or high-order modulation scheme. In some embodiments, the stored bit sequence represents an IEEE 802.15.4 chip sequence encoding a fixed symbol—preferably the zero symbol (e.g., "0000"), since this will occur in the header and payload of most data packets.

The modulation scheme is preferably such that the predetermined signal pattern will appear in both the header and payload of a data packet (that is, a typical data packet, possibly ignoring pathological cases such as packet that has a null payload). In this way, there is a high chance of detecting a busy channel even if only a fragment of a data packet is received (e.g., if the clear channel assessment module is activated while a data packet is part-way through being transmitted, possibly between two devices other than the radio receiver).

The clear channel assessment module may identify peaks in any appropriate manner. In a preferred set of embodiments, a peak is identified whenever the correlation signal exceeds a peak-threshold value. The peak-threshold value is preferably set so that any correlation side-lobes are below the peak-threshold value. The correlator and the peak-threshold value are preferably arranged such that only a single sample in the correlation signal exceeds the peak-threshold value for each local maximum within the correlation signal. In this way, counting peaks can be implemented by counting the number of samples that exceed the peak-threshold value. This allows for a particularly efficient implementation.

The clear channel assessment module may thus comprise a filter arranged to output a first signal (e.g., a logic high) for each sample that exceeds the peak-threshold value. The filter is preferably arranged to output a second, different signal (e.g., a logic low) for each sample that is below the peak-threshold value. The clear channel assessment module may comprise an accumulator arranged to receive the filter output and to count the number of samples exceeding the peak-threshold value over the fixed time window. The clear channel assessment module may comprise a comparator arranged to compare the output of the accumulator with the threshold count value. The comparator is preferably arranged to output a comparison result after the fixed time window. The comparator may be arranged to generate the busy signal when the output of the accumulator exceeds the threshold count value. The comparator may be arranged to generate a clear signal, different from the busy signal, when the output of the accumulator is below the threshold count value. When the output equals the threshold count value, the comparator may be arranged to output the busy signal, or it may be arranged to output the clear signal. The clear channel assessment module may comprise a timer arranged to reset the accumulator after the fixed time window. The clear channel assessment module may be arranged to perform a succession of counts, over a plurality of time windows, each equal to the fixed time window. These time windows may be contiguous, or may be separated by intervals.

The duration of the fixed time window may be static (e.g., set by physical circuitry, or by firmware installed on the device). Alternatively, it may be variable—e.g., configurable by software running on the radio receiver. However, in preferred embodiments it will be fixed for at least a plurality of successive cycles of the clear channel assessment module. It may be changed based on channel conditions, on the modulation scheme, or any other relevant factor. It preferably remains constant at least between successive radio transmissions by the device.

Similarly the peak-threshold value may be static (e.g., set by physical circuitry, or by firmware installed on the device), or it may be variable—e.g., configurable by software running on the radio receiver. However, in preferred embodiments it will be fixed for at least a plurality of successive cycles of the clear channel assessment module. It may be changed based on channel conditions, on the modulation scheme, or any other relevant factor. It preferably remains constant at least between successive radio transmissions by the device.

Similarly the threshold count value may be static (e.g., set by physical circuitry, or by firmware installed on the device), or it may be variable—e.g., configurable by software running on the radio receiver. However, in preferred embodiments it will be fixed for at least a plurality of successive cycles of the clear channel assessment module. It may be changed based on channel conditions, on the modulation scheme, or any other relevant factor. It preferably remains constant at least between successive radio transmissions by the device. The threshold count value is preferably determined based on the modulation scheme. It preferably depends on the expected number of peaks for the predetermined signal pattern in a random transmission. For example, if the radio receiver is arranged to demodulate data modulated with a binary modulation scheme, and the correlator is matching against a zero bit, the threshold count value may correspond to half the bit rate over the fixed time window (e.g., be set equal to or a little below this value), on the basis that, statistically, half the received bits over the channel can be expected to be zero bits.

The correlation may be arranged to cross-correlate a plurality of predetermined signal patterns with the electronic signal. These may represent different respective data symbols. Different respective counts may be made for each predetermined signal pattern, and logic used to determine whether to output a busy signal based on whether each count exceeds a respective threshold count value. Alternatively, the counts may be aggregated over the fixed time window and compared with the single threshold count value.

The same correlator may be used to demodulate the electronic signal and to decode data from the electronic signal, although this is not essential. In some embodiments, the correlator is also used for timing synchronisation (e.g., packet and/or symbol timing) and/or frequency correction. However, in some embodiments a different decoder (e.g., a matched filter bank) may be used to decode data from the electronic signal.

The radio receiver preferably comprises a processor. The busy signal may be output to the processor. In some embodiments, one or more further factors, such as received energy in a frequency band, may be combined with the output of the clear channel assessment module to make a determination as to whether or not to take an action, such as transmitting a radio signal.

The clear channel assessment module may be arranged to output a clear signal in response to determining that the number of peaks does not exceed the threshold count value. However, the clear channel assessment module may be arranged to require a different threshold count value to be passed before transitioning from a busy signal to clear signal.

The radio receiver may also be a radio transmitter, or may be included in a device which also comprises a radio transmitter. An electronic device comprising a radio receiver as described herein forms a further aspect of the invention.

The radio receiver may be arranged to perform a clear channel assessment continuously. However, more preferably, the clear channel assessment module is active only intermittently—for example, for a period of time before the device intends to transmit a radio communication. The device may be arranged to delay sending of a radio communication if a busy signal is output by the clear channel assessment module—e.g., delaying transmission by a back-off period, which may be randomised.

The radio receiver is preferably arranged to perform a clear channel assessment simultaneously with demodulating a data signal. In this way, the start of an incoming data packet, intended for the radio receiver, will not be lost if the clear channel assessment module is active (e.g., because the radio receiver is intending to transmit a signal imminently).

The radio receiver is preferably an integrated device—e.g., a silicon chip. It may be a radio-on-a-chip device. The clear channel assessment module may be implemented in software, but is preferably implemented as a dedicated electronic circuit distinct from any general-purpose processor on the device.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which.

Figure 1:
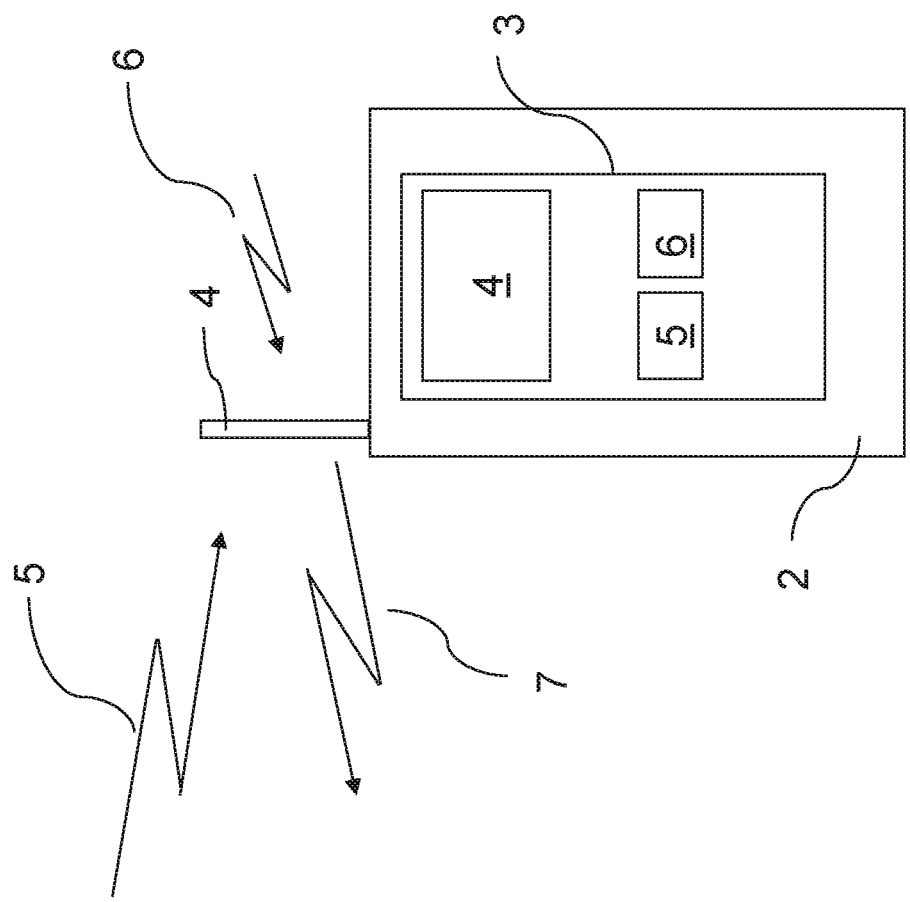
FIG. 1 is a schematic drawing of a radio communications system embodying the invention.

FIG. 1 shows a wireless heart-rate monitor 1 and a smartphone 2. Each device 1, 2 comprises a transceiver embodying the present invention and communicate with each other using the IEEE 802.15.4 communications protocol. However, in other examples, the devices 1, 2 may communicate with each other using a different radio communications protocol such as Bluetooth® Low Energy.

Specifically, the smartphone 2 has, among other conventional components (not shown), an RF antenna 4 connected to a transceiver 3. The RF antenna 4 is configured to receive radio waves 5 and 6 and convert them into an electrical signal. Preferably, the antenna 4 receives a radio wave 5 that has been modulated to convey an IEEE 802.15.4 compliant data packet from the wireless heart-rate monitor 1. However, the antenna 4 may additionally or alternatively receive background radio waves 6 from other radiation sources such as other smartphones with which communication is not desired or other devices (e.g. microwave ovens) that may indirectly emit radio waves. Thus, it will be seen that background radio waves 6 may or may not be modulated to convey data.

The transceiver 3 comprises a radio transmitter 6, a radio receiver 5 and a processor 4 (such as an ARM™ Cortex M-series). The radio transmitter 6 includes an encoder (among other components). When in a transmit mode, the microprocessor 4 may process data for transmission into a suitable IEEE 802.15.4 compliant message format and send a data packet to the radio transmitter 4. The encoder 5 in the radio transmitter 4 modulates the message onto a radio-frequency signal 7 using known techniques such as offset quadrature phase-shift keying (OQPSK). The radio transmitter 6 then transmits the data packet from the antenna 4 to a recipient.

For a short time period before transmitting, the smartphone 2 performs a clear channel assessment (CCA).

When a CCA is initiated, the radio receiver 5 is activated so as to allow the smartphone 2 to receive radio waves in the frequency band over which it wishes to transmit. During this time, the RF antenna 4 may pick up radio waves 5, 6 (which may or may not be modulated with data) and convert the these into an electrical signal. The electrical signal is passed to the radio receiver 5 for performing a clear channel assessment. The radio receiver 5 can also perform other radio receiving processes such as data demodulation, when the received radio waves 5, 6 are determined to comprise appropriately-modulated data. The clear channel assessment process is detailed below with reference to FIG. 2.

Figure 2:
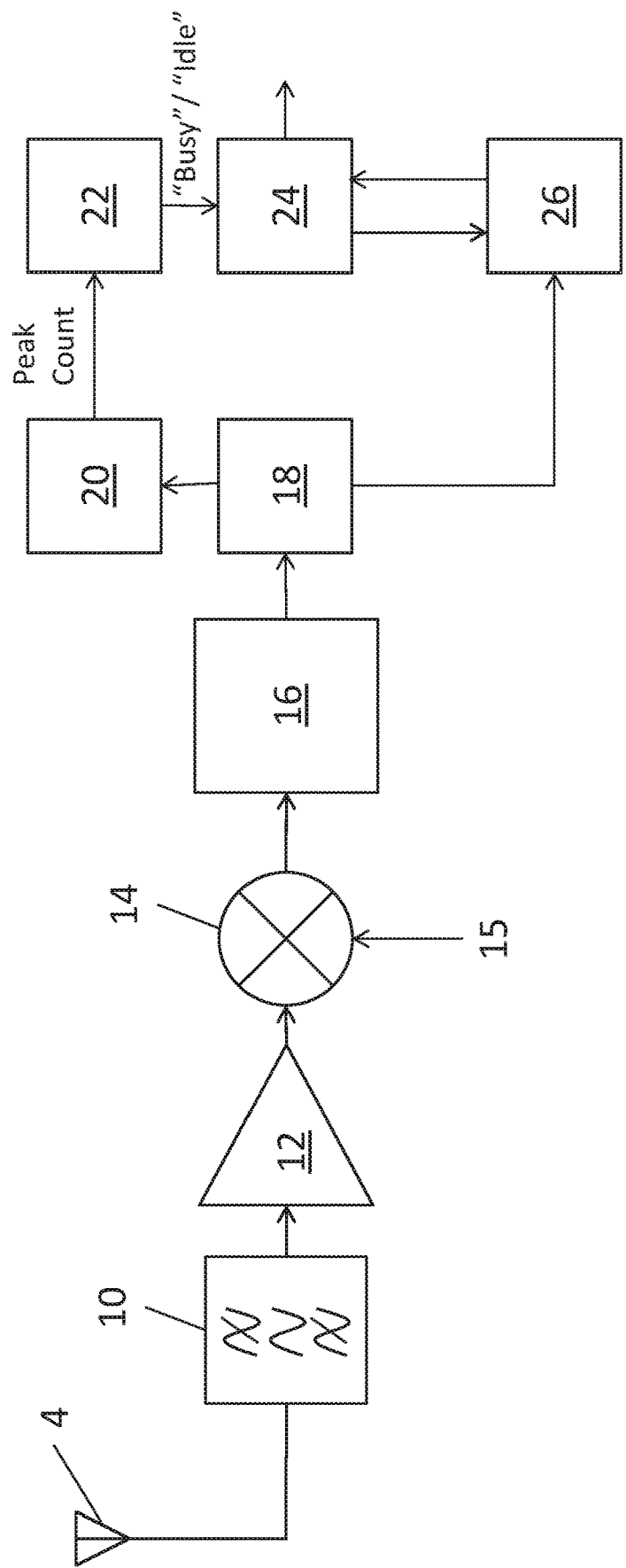
FIG. 2 is block diagram of a radio receiver device in accordance with an embodiment of the present invention.

FIG. 2 is a more detailed block diagram of the radio receiver 5 shown in FIG. 1. However, it will of course be appreciated that this is merely an example and that the radio receiver 5 described below may be used in a wide variety of different radio communication devices and systems.

The radio receiver 5 comprises: a bandpass filter 10; an amplifier 12; a mixer 14; a sample-and-hold digital signal processor (DSP) 16; a correlator 18; a peak counter 20; a clear channel assessment (CCA) decision unit 22; a processor 24; and a decoder 26. It will be appreciated that the processor 24 may be the microprocessor 4 shown in FIG. 1, or it could be a different processor.

When the radio receiver 5 receives an electrical signal from the antenna 4, the electrical signal is passed through the bandpass filter 10 which removes frequency components that are not within a desired frequency spectrum. The resulting filtered signal is amplified by the amplifier 12 which provides an amplified, filtered signal to an input of the mixer 14. This mixer 14 also receives a local oscillator signal 15 such that the mixer 14 down-mixes the signal from the amplifier 12, which could be to baseband or to an intermediate frequency.

The resulting down-mixed signal is input to the sample-and-hold processor 16 which converts the analogue down-mixed signal to a digital signal comprising a number of quantised samples at baseband. The resultant digital samples are fed into the correlator 18. The correlator 18 cross-correlates the digital signal (e.g. sequence of digitised complex-valued baseband samples) with a set of values representing a stored bit sequence. The stored bit sequence may correspond to an IEEE 802.15.4 chip sequence encoding a four-bit zero symbol ("0000"). Depending on the DSSS encoding used, the zero symbol chip sequence may be 16 bits long (e.g. [1010100100010111]) or 32 bits long. The correlator 18 provides a sequence of correlation value outputs indicative of how well the stored bit-sequence values match the input samples at particular points in time. A high peak correlation value typically occurs when the stored values closely or exactly match the input samples. The correlation values are fed into the peak counter 20, whose operation is described in more detail below.

It will be appreciated that when a radio wave 5 that has been modulated to convey an IEEE 802.15.4 compliant data packet is received by the antenna 4, and when the stored bit sequence values correspond to an IEEE 802.15.4 zero symbol chip sequence, the correlator 18 will output a correlation-peak for each zero symbol in the received radio wave. In contrast, when a received radio wave 6 doesn't comprise data (as may be the case when the received radio signal is just background noise), the correlator 18 will not output a correlation peak because there isn't a zero symbol waveform in the sampled sequence for the correlator 18 to match with the stored zero symbol values.

Figure 3:
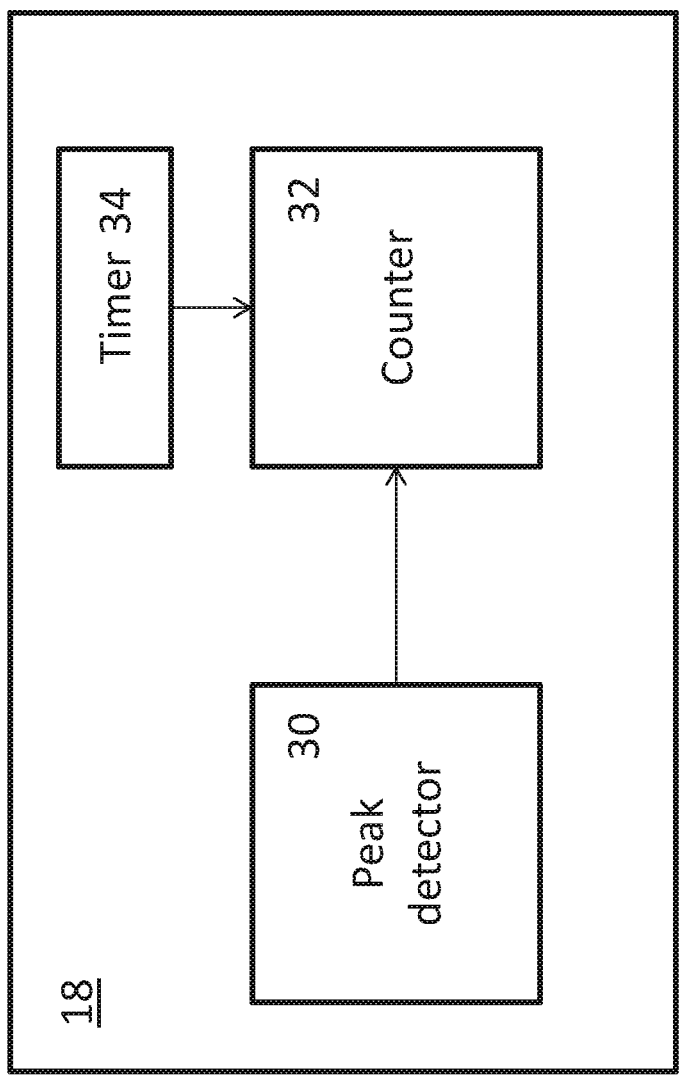
FIG. 3 is a schematic drawing of the peak counter block of FIG. 2.

As shown in FIG. 3, the peak counter 20 comprises a peak detector 30, a counter 32, and a timer 34. The peak detector 30 is arranged to determine which one or more of the correlation values represent correlation-peaks by comparing the correlation values against a fixed threshold value. Correlation values that exceed the fixed threshold are determined to be correlation-peaks. In general, the fixed threshold value is set sufficiently high so that it excludes side-lobes to a main correlation peak and so that only a single sample in each correlation-peak exceeds the threshold. The peak detector 30 outputs a binary value at each sample interval: "1" if the correlation value is above the fixed threshold value and "0" if it is below the fixed threshold value. The counter 32 counts the number of "1" values issued by the peak detector 30 over a fixed time period of 3 milliseconds. The fixed time period is set by the timer 34 which repeatedly counts from 0 to 3 milliseconds. Each time the timer 34 counts to the end of the fixed time period, it is configured to issue a reset signal to the counter 32. The reset signal causes the counter 32 to output its count value for that time period and reset, thereby providing the total number of correlation-peaks that have been identified over the latest time period. The time period is fixed for a succession of count cycles 32, although it may be configurable over a longer time scale (e.g., between successive packet transmissions by the device 2).

The fixed time period may have any appropriate fixed length. For example, a time period having a length of between 1 and 10 milliseconds may be used. The fixed time period may be a multiple of the duration of an IEEE 802.15.4 zero-symbol chip sequence. In some embodiments, the processor 24 may perform the functions of the timer.

Returning to FIG. 2, the CCA decision unit 22 is configured to receive the count value from the counter 32 and determine whether the total number of identified correlation-peaks that have been counted over the fixed time period equals or exceeds a threshold count. If the count exceeds the threshold count, the CCA decision unit 22 issues a "channel busy" signal to the processor 24. The "channel busy" signal indicates that the channel (determined by the combination of the frequency band and the modulation scheme) over which the radio waves 5, 6 were received is currently being used by another transmitter probably employing the same, or a similar, modulation scheme. If the count is below the threshold count, the CCA decision unit 22 is configured to issue a "channel idle" signal to the processor 24. The "channel idle" signal indicates that the channel is not currently being used by another transmitter with the same modulation scheme.

The threshold count may be fixed for the device 2, or it may be variable, with the device 2 being able to vary it over time based on channel conditions or other factors.

The processor 24 decides whether or not to start transmitting a data packet based on which type of signal is issued by the CCA decision unit. If a "channel idle" signal is issued, the processor 24 may allow the transmitter unit 6 to start transmitting a data packet. If a "channel busy" signal is issued, the processor 24 will instruct the decoder 26 to decode the received radio waves. Decoding may be done using conventional processes. If the decoded data is not addressed to the specific device 2, decoding may be interrupted and the data discarded. If the decoded data is addressed to the specific device 2, the decoder 26 will send the data payload to the processor 24 for further action. The CCA decision unit 22 will maintain the "channel busy" status while the data packet is being received. The device 2 may check the CCA output continually until a "channel idle" signal is generated, and then transmit the data packet, or it may delay transmission for a period, and check the CCA again shortly before reattempting transmission of the data packet.

In some embodiments the CCA decision unit 22 may also take account of other factors such as the energy level of the received signals when deciding whether to issue a "channel idle" signal or a "channel busy" signal to the processor 24.

It will be appreciated by those skilled in the art that the invention has been illustrated by describing one or more specific embodiments thereof, but is not limited to these embodiments.

The invention claimed is:

1. A radio receiver arranged to receive radio frequency signals, wherein the radio receiver is an integrated-circuit device comprising:
   an electronic tuner circuit, arranged to output an electronic signal representing a radio-frequency signal received by the radio receiver, wherein the radio-frequency signal is modulated according to a modulation scheme;
   an electronic correlator circuit, arranged to receive the electronic signal from the electronic tuner circuit and to cross-correlate a predetermined signal pattern, representing one symbol in the modulation scheme, with the electronic signal, and to output a correlation signal; and
   a clear channel assessment module circuit, wherein the clear channel assessment module circuit is an electronic hardware component of the integrated-circuit device and is arranged to receive the correlation signal from the electronic correlator circuit and to determine when the number of peaks in the correlation signal, over a fixed time window, exceeds a threshold count value, and to output a busy signal in response to determining that the number of peaks exceeds the threshold count value.

2. The radio receiver of claim 1, wherein the predetermined signal pattern is an IEEE 802.15.4 chip sequence encoding a fixed symbol.

3. The radio receiver of claim 2, wherein one or both of the peak-threshold value and the threshold count value is static.

4. The radio receiver of claim 1, wherein the clear channel assessment module circuit is arranged to identify a peak in the correlation signal whenever the correlation signal exceeds a peak-threshold value.

5. The radio receiver of claim 4, wherein the electronic signal is sampled and wherein the electronic correlator circuit and the peak-threshold value are arranged such that, for each local maximum within the correlation signal, only a respective single sample in the correlation signal exceeds the peak-threshold value.

6. The radio receiver of claim 4, wherein the electronic signal is sampled and wherein the clear channel assessment module circuit comprises:
   an electronic filter circuit arranged to output a signal for each sample of the electronic signal, received by the clear channel assessment module circuit from the electronic tuner circuit, that exceeds the peak-threshold value;
   an electronic accumulator circuit arranged to receive the signal output by the electronic filter circuit and to count the number of samples exceeding the peak-threshold value over the fixed time window; and
   an electric comparator circuit arranged to compare the output of the electronic accumulator circuit with the threshold count value, and to generate the busy signal when the output of the accumulator exceeds the threshold count value.

7. The radio receiver of claim 1, wherein the electronic correlator circuit is used to demodulate the electronic signal and to decode data from the electronic signal.

8. The radio receiver of claim 7, further arranged to perform a clear channel assessment simultaneously with demodulating the electronic signal.

9. The radio receiver of claim 1, wherein the clear channel assessment module circuit is arranged to output a clear signal in response to determining that the number of peaks does not exceed the threshold count value.

10. The radio receiver of claim 1, wherein the modulation scheme is such that the predetermined signal pattern appears in both the header and the payload of a data packet.

11. A method for performing a clear channel assessment, the method comprising:
   receiving an electronic signal representing received radio waves modulated according to a modulation scheme;
   cross-correlating a predetermined signal pattern, representing one symbol in the modulation scheme, with the electronic signal to generate a correlation signal comprising a sequence of correlation values;
   determining when a number of peaks in the correlation signal, over a fixed time window, exceeds a threshold count value; and
   outputting a busy signal in response to determining that the number of peaks exceeds the threshold count value.

12. The method of claim 11, wherein the method further comprises demodulating the electronic signal and decoding data from the electronic signal.

13. The method of claim 12, wherein the clear channel assessment is performed simultaneously with demodulating the electronic signal.

* * * * *